No. 621,946. Patented Mar. 28, 1899.
G. A. ROSENBAUER & J. P. SCHOWALTER.
BICYCLE HANDLE BAR.
(Application filed June 6, 1898.)
(No Model.)
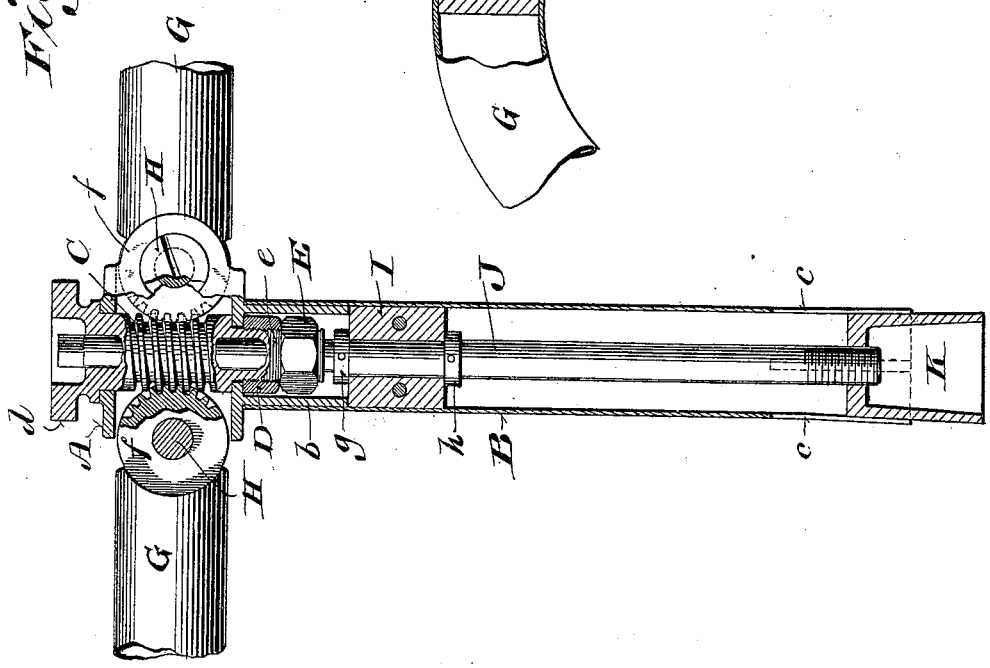
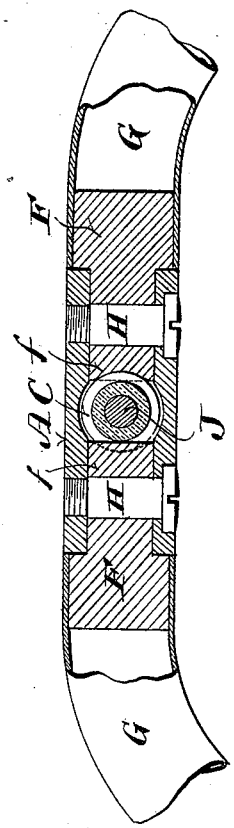

UNITED STATES PATENT OFFICE.

GEORGE A. ROSENBAUER AND JOSEPH P. SCHOWALTER, OF MILWAUKEE, WISCONSIN, ASSIGNORS TO THE SANGER HANDLE-BAR AND PLATING COMPANY, OF SAME PLACE.

BICYCLE HANDLE-BAR.

SPECIFICATION forming part of Letters Patent No. 621,946, dated March 28, 1899.

Application filed June 6, 1898. Serial No. 682,653. (No model.)

*To all whom it may concern:*

Be it known that we, GEORGE A. ROSENBAUER and JOSEPH P. SCHOWALTER, citizens of the United States, and residents of Milwaukee, in the county of Milwaukee and State of Wisconsin, have invented certain new and useful Improvements in Bicycle Handle-Bars; and we do hereby declare that the following is a full, clear, and exact description thereof.

Our invention has for its object to provide simple economical bicycle handle-bars having grip members adjustable to various angles and also to utilize shank-expanders as parts of said handle-bars.

Therefore said invention consists in certain peculiarities of construction and combination of parts hereinafter set forth with reference to the accompanying drawings and subsequently claimed.

Figure 1 of the drawings represents an elevation of a portion of an improved bicycle handle-bar in accordance with our invention, partly broken away and in section; and Fig. 2, a plan view of the same, partly in horizontal section.

Referring by letter to the drawings, A represents a metallic angular shell having a depending tubular stem $b$, on which is brazed a tube B, herein shown as having longitudinal kerfs $c$ at intervals circumferentially of its lower end. The shell, its stem, and the tube aforesaid constitute the shank of our improved bicycle handle-bar.

Rotative in the shell, central of the same, is a worm-stem C, having a milled or nut head $d$, that comes into contact with the exterior surface of the shell-top to hold said worm-stem against vertical movement in a downward direction. Extending through an aperture in the shell-bottom is a reduced screw-threaded portion of the worm-stem, and a nut D on this reduced portion of said worm-stem serves to prevent vertical movement of the latter in an upward direction, a jam-nut E being also employed to hold the former nut in adjusted position.

In mesh with the worm portion of stem C are worm-toothed rounded ends $f$ of fittings F, to which the tubular grip members G of our improved bicycle handle-bar are brazed, and these rounded ends of said fittings are loose on pivot-screws H, engaging the sides of shell A aforesaid. The sides of shell A are longer than its top and bottom, and the ends of these sides are convex in opposition to concave shoulders of the fittings F. Therefore it will be understood that said fittings, with the grip members G, may be adjusted up or down on arcs of circles incidental to rotation of the worm-stem C; these arcs being concentric with the pivot-screws above specified.

A bushing I is shown fast in the tube B, constituting part of the handle-bar shank, and rotative in this bushing is a rod J, held against vertical movement by means of upper and lower collars $g\ h$ in opposition to said bushing. The lower end of the rod is in screw-thread connection with a conical shell K, that operates as an expander for the lower kerfed end of the handle-bar shank, and the preferably-reduced upper portion of said rod has loose fit in the worm-stem C, the latter being bored longitudinally.

The rod has its upper end within a counterbore of the worm-stem head, and this end is squared for the engagement of a corresponding socket-wrench or other turning-tool, rotation of said rod serving to adjust the expander in the handle-bar shank.

Having thus described our invention, what we claim as new, and desire to secure by Letters Patent, is—

A bicycle handle-bar comprising a hollow shell provided with a depending tubular shank longitudinally kerfed at intervals circumferentially of its lower end, a conical expander engaging the kerfed end of said shank, a rod in screw-thread connection with the expander, a bushing fast in the aforesaid shank to constitute a bearing for the rod, means for preventing other than rotary movement of the rod in the bushing, a worm-stem loose on the rod but having rotative connection with the shell, and grip members having rounded worm-toothed terminals in pivotal connection with said shell to mesh with said stem.

In testimony that we claim the foregoing we have hereunto set our hands, at Milwaukee, in the county of Milwaukee and State of Wisconsin, in the presence of two witnesses.

GEORGE A. ROSENBAUER.
JOSEPH P. SCHOWALTER.

Witnesses:
N. E. OLIPHANT,
B. C. ROLOFF.